United States Patent [19]

Henmi et al.

[11] Patent Number: 4,547,872
[45] Date of Patent: Oct. 15, 1985

[54] OPTICAL RECORDING AND REPRODUCING APPARATUS WITH IMPROVED FOCUSSING CONTROL

[75] Inventors: Fumiaki Henmi, Atsugi; Yoshio Aoki, Tokyo, both of Japan

[73] Assignee: Sony Corporation, Tokyo, Japan

[21] Appl. No.: 401,016

[22] Filed: Jul. 22, 1982

[30] Foreign Application Priority Data

Jul. 24, 1981 [JP] Japan .................. 56-116653

[51] Int. Cl.$^4$ ............... G11B 21/12; G11B 3/82; G11B 7/00
[52] U.S. Cl. .................... 369/45; 369/54; 369/116; 369/121
[58] Field of Search ............... 369/44–46, 369/106, 109, 116, 118–121, 54, 58

[56] References Cited

U.S. PATENT DOCUMENTS

| | | | |
|---|---|---|---|
| 4,059,841 | 11/1977 | Bricot et al. | 369/121 X |
| 4,085,423 | 4/1978 | Tsunoda et al. | 369/45 |
| 4,093,961 | 6/1978 | Kanameua et al. | 369/116 X |
| 4,241,423 | 12/1980 | Burke et al. | 369/121 X |
| 4,243,850 | 1/1981 | Edwards | 369/46 |
| 4,283,785 | 8/1981 | Miyauchi et al. | 369/121 X |
| 4,298,974 | 11/1981 | Tsunoda et al. | 369/45 |
| 4,305,144 | 12/1981 | Okada | 369/46 |
| 4,352,981 | 10/1982 | Sugayama et al. | 369/45 X |
| 4,363,116 | 12/1982 | Kleuters et al. | 369/45 X |
| 4,380,015 | 4/1983 | Ito et al. | 369/116 X |
| 4,494,226 | 1/1985 | Hazel et al. | 369/54 X |

Primary Examiner—Aristotelis M. Psitos
Attorney, Agent, or Firm—Lewis H. Eslinger; Alvin Sinderbrand

[57] ABSTRACT

An optical information recording and reproducing apparatus for recording and reproducing an information signal on and from a recording medium, respectively, having a recording track, and which includes a beam generator, having a laser, for generating a primary beam and first and second secondary beams of light arranged substantially in the same direction as the track on the recording medium, a focussing lens for focusing the primary beam and first and second secondary beams of light on the recording medium, and a detecting device having a primary photodetector for detecting a reflected primary beam from the recording medium and first and second secondary photodetectors for detecting reflected first and second secondary beams from the recording medium. Additionally the apparatus includes a beam intensity control device for controlling the intensity of at least the primary light beam such that high and low intensities of at least the primary beam are sufficient to create and prevent indicia in the recording medium, respectively, in accordance with the information signal when the apparatus is in a recording mode and for controlling the intensity of at least the primary beam such that a substantially constant intensity is maintained in at least the primary beam to prevent indicia from being formed in the recording medium when said apparatus is in a reproducing mode. The apparatus also includes a focussing control device for controlling the position of the focussing lens by using the amplified difference between the outputs of the first and second secondary photodetectors when the apparatus is in a recording mode, and a position control device for controlling the tracking of the primary beam on the recording track in response to the amplified difference between the outputs of the first and second secondary photodetectors when the apparatus is in a reproducing mode.

10 Claims, 4 Drawing Figures

OPTICAL RECORDING AND REPRODUCING APPARATUS WITH IMPROVED FOCUSSING CONTROL

BACKGROUND OF THE INVENTION

1. Field of the Invention

The present invention relates generally to an optical information recording and reproducing apparatus and more particularly to an optical information recording and reproducing appparatus which can record an information signal on a recording medium and repeatedly reproduce the recorded information signal therefrom.

2. Description of the Prior Art

A previously proposed optical information recording and reproducing apparatus generally causes the following defects in a recording mode. In general, an optical information recording and reproducing apparatus includes an optical recording medium or a recording disc formed by interposing, for example, a metal layer having a low melting point between transparent resinuous or glass layers as in a sandwich shape. During the recording mode of the apparatus the recording disc is irradiated by a converging high intensity beam in response to information signals which causes a partial melting of the melt layer thereof and thereby results in a spirally arranged recording track formed of pits or indicia.

If the converging state of, for example, the laser beam is poor, the pits or indicia which comprise the recording track may not be perfectly formed or may not be formed at all on the recording disc creating a defective and unacceptable recording track.

In particular, if such an apparatus includes an objective lens with a large numerical aperture (NA) to effectively utilize the laser beam, then even a slight defocusing of the lens causes the aforesaid defective and unacceptable recording track.

In an attempt to overcome this defect, and as previously proposed, a beam, such as the laser beam when used in the recording mode, is reflected from the recording disc and thereafter detected by an optical or photodetector whereby the converging condition of the laser beam is controlled by the detected output thereof.

However, inasmuch as the reflected beam is produced by reflecting the laser beam onto indicia, which are created during the melting state, it is impossible to detect the quality of the shape of the indicia before they are completely formed. For this reason, the converging condition of the recording laser beam can not be adequately or positively controlled and therefore makes it quite difficult to achieve an acceptable track recording.

Additionally, it is highly desirable to use as many of the same circuit elements, in the apparatus, for both the recording and reproducing modes as possible in order to reduce the manufacturing cost of the apparatus.

OBJECTS AND SUMMARY OF THE INVENTION

Accordingly, it is an object of the present invention to provide an optical information recording and reproducing apparatus for recording and reproducing an information signal on and from a recording medium, respectively which obviates the aforesaid defects inherent in the apparatus disclosed heretofore.

More specifically it is an object of the present invention to provide a new and improved optical information recording and reproducing apparatus which records an optical information signal on an optical recording medium having greater control of the shape of the indicia formed thereon and thereby improving the quality of the recording as compared to the prior art.

A further object of the invention is to provide an optical information recording and reproducing apparatus in which a number of circuit elements are commonly used in both the recording and reproducing modes and to thereby reduce the manufacturing cost of the apparatus.

According to an aspect of the present invention, an optical information recording and reproducing apparatus for recording and reproducing an information signal on and from a recording medium, respectively, having a recording track, comprises:

(A) a beam generator including a laser, for generating a primary beam and first and second secondary beams of light which are arranged substantially in the direction of the track on the recording medium;

(B) a focussing lens for focussing the primary and first and second secondary beams of light on the recording medium;

(C) detecting means, including a primary photodetector for detecting the primary beam reflected from the recording medium and first and second secondary photodetectors for detecting the first and second secondary light beams reflected from the recording medium;

(D) beam intensity control means for controlling the intensity of at least the primary beam so that high and low intensities of at least the primary beam are sufficient to create and prevent indicia in said recording medium, in accordance with the information signal, when the apparatus is in a recording mode, and for controlling the intensity of the primary beam such that a substantially constant intensity is maintained in at least the primary beam to prevent indicia from being formed in the recording medium in a reproducing mode;

(E) focussing control means for controlling the position of the focussing lens in response to the difference between the output signals of the first and second secondary photodetectors when the apparatus is in a recording mode; and (F) tracking control means for acting to control the position of the primary light on the recording track in response to the output signals of the first and second photodetectors.

The above, and other objects, features and advantages of the present invention will become apparent from the following description taken in conjunction with the accompanying drawings in which the like numerical references designate the same elements and parts.

DESCRIPTION OF THE PREFERRED EMBODIMENT

Figure 1:
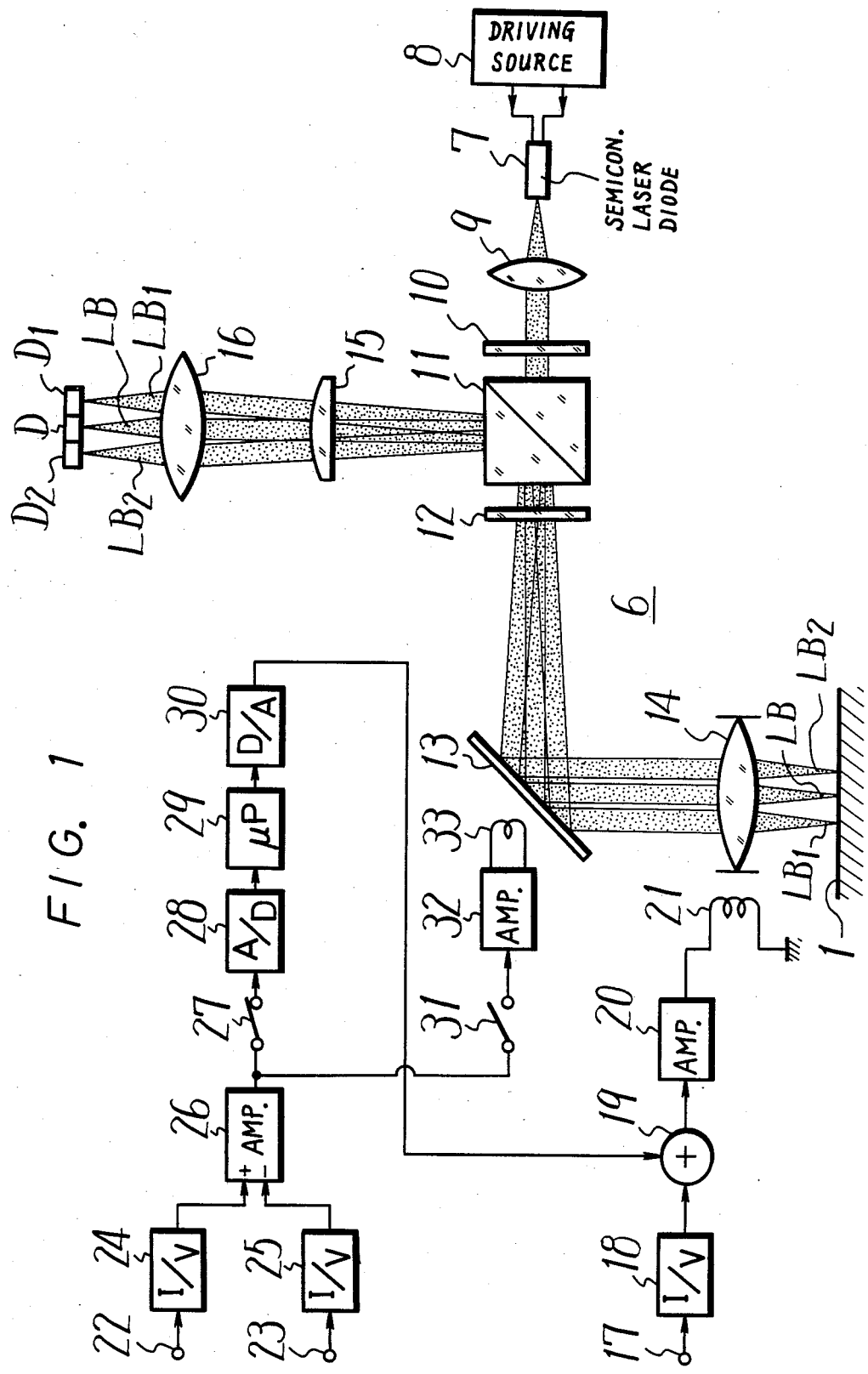
FIG. 1 is a block diagram schematically showing an embodiment of an optical information recording and reproducing apparatus in accordance with the present invention.

FIG. 1 diagrammatically illustrates an overview of an optical information recording and reproducing apparatus in accordance with the present invention.

Figure 2:
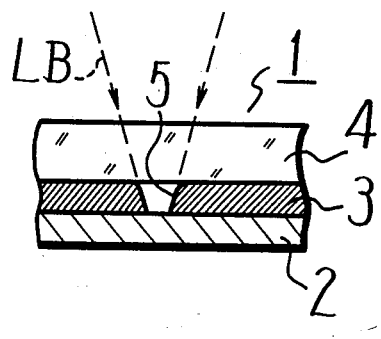
FIG. 2 is a cross-sectional view of a portion of an optical recording medium used in FIG. 1.

In FIG. 1, reference numeral 1 denotes an optical information recording medium whose construction which is that of a recording disc is shown in greater detail with reference to FIG. 2. In FIG. 2, reference numeral 2 denotes a base or substrate made of, for example, an acryl resin or other similar material, or a transparent layer of glass or other translucent material or a low reflectivity layer of material, 3 indicates a metal layer with a low melting point formed on the substrate 1 made of tellurium TE, an alloy thereof, or an oxide thereof, and 4 designates a protective layer of, for example, an acryl resin or a transparent layer such as glass or the similar material formed on metal layer 3. Numeral 5 denotes a pit or indicium such as a through-bore formed through metal layer 3 which is melted by a laser beam LB.

Referring once again to FIG. 1, the numeral 6 denotes a beam generator, described below, which includes a laser beam generating source 7, and is typically formed of a semiconductor laser diode. Numeral 8 denotes a driving source for driving semiconductor laser diode 7 and is provided with means for generating a pulse current in response to an information signal for varying the peak value or pulse width applied to diode 7 such that a large peak value or pulse width is applied to diode 7 when the apparatus is in recording mode and a small peak value or pulse width is applied to diode 7 when the apparatus is in a reproducing mode.

A laser beam, which is a divergent beam having a spherical waveform derived from semiconductor laser diode 7 is converted by a collimating lens 9 to a parallel beam having a plane waveform, and then introduced into a diffraction grating 10 to provide three beams, namely, a O-order diffraction beam referred to as primary beam LB and ± first order diffraction beams (first and second secondary beams $LB_1$ and $LB_2$). Beams LB, $LB_1$, $LB_2$ are introduced through a polarizing beam splitter 11 and a quarter wavelength plate 12 to a tracking mirror (galvanomirror) 13 which reflects these beams and directs them to an objective lens 14 having a large NA. Objective lens 14 causes the beams to converge and strike the recording medium 1 so as to form focuses thereon.

Figure 4:
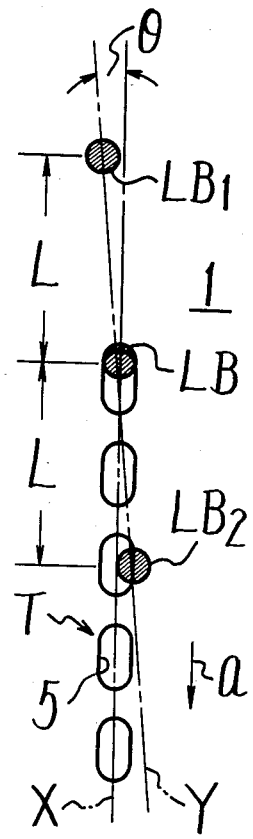
FIG. 4 is an explanatory diagram illustrating the relationship between the indicia on the optical recording medium and the beam of light striking the recording medium.

Beams LB, $LB_1$, and $LB_2$ are introduced on recording medium 1 such that the spots formed thereby are arranged substantially along the direction of the recording track. That is, as shown in FIG. 4, beams LB, $LB_1$ and $LB_2$ are arranged on a line Y intersecting a center line X of a recording track T (which is a spiral line nearly equal to a circle) at a small angle $\theta$. The distance between adjacent spots is equal to interval L (wherein the distance of each interval L is selected to be wide enough, such that it is possible to detect the completed indicia which are under stable conditions). The order of the light beams striking track T is $LB_1 \rightarrow LB \rightarrow LB_2$ along a rotational direction a (moving direction) of recording medium 1. In this case, angle $\theta$ is selected such that in the reproducing mode, the right and left halves of the spots formed by first and second secondary beams $LB_1$ and $LB_2$ respectively may overlap each indicia 5.

The respective beams LB, $LB_1$ and $LB_2$ upon reflection by recording medium 1 follow a reverse course which includes objective lens 14, tracking mirror 13, quarter wavelength plate 12, and through polarizing beam splitter 11. The reflected beams LB, $LB_1$ and $LB_2$ are then introduced through a lenticular lens (cylindrical lens) 15 and a convergence lens 16 so as to form focuses on detecting screens of a primary optical or photodetector D and first and second secondary optical or photodetectors $D_1$ and $D_2$.

Figure 3:
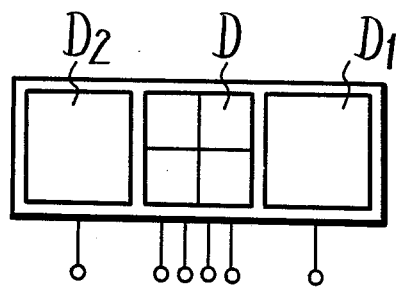
FIG. 3 is a plan view of the primary and secondary photodetectors used in FIG. 1.

As shown in FIG. 3, primary photodetector D is located at the center, and first and second secondary photodetectors $D_1$ and $D_2$ are located on both sides of primary photodetector D. Primary photodetector D includes four detecting sections located horizontally and vertically, in which a reproduced information signal is represented by a sum of the detected signals derived from the four detecting sections thereof while a focus error signal is provided by a difference between the sums of the detected outputs from the pairs of the detecting sections on the two diagonal lines.

The focus error signal derived from primary photodetector D is supplied through an input terminal 17 to a current-voltage converting circuit or converter 18 which supplies an output signal to an adder 19. The output from adder 19 is supplied through a focussing servo amplifier 20 to a voice coil 21 for driving a linear motor of objective lens 14 to allow the focussing servo of objective lens 14 to operate in both the recording and reproducing modes of operation.

Moreover, the detected outputs of first and second secondary photodetectors $D_1$ and $D_2$ are respectively supplied through input terminals 22 and 23 to current-voltage converting circuits or converters 24 and 25. The outputs derived from current-voltage converters 24 and 25 are supplied to a differential amplifier 26 which functions as either comparator or subtracter.

The output from differential amplifier 26 is supplied through a switch 27, which is turned ON in the recording mode (turned OFF in the reproducing mode), to an analog-to-digital (A/D) converter 28 whose digital output is supplied to a micro-processor 29. The digital output derived from micro-processor 29 is supplied to a digital-to-analog (D/A) converter 30 whose analog output (bias voltage) is supplied to adder 19 to be added to the focus error signal.

Micro-processor 29 performs a test recording in advance of recording the information on the recording medium so as to form and supply a stair case or sawtooth wave signal suitable as a test signal to adder 19, whereby a reference bias voltage, which maximizes the value of the output signal of differential amplifier 26 and is supplied to adder 19, is detected and memorized by microprocessor 29. In the actual recording mode, micro-processor 29 is operated such that in order to maximize the value of the output voltage of differential amplifier 26, the bias voltage to be supplied to the adder 19 is varied with the reference bias voltage serving as the center of the variation. As described above, primary beam LB is focussed positively on recording medium 1 so as to melt metal layer 3 thereof to form the perfect indicia 5 thereon. During the recording mode of operation, however first and second secondary beams $LB_1$ and $LB_2$ each have a sufficiently low intensity to prevent melting of the metal layer 3.

Furthermore, the output of differential amplifier 26 is supplied through a switch 31, which is turned ON in the reproducing mode, to a tracking servo amplifier 32, the output of which is supplied to a coil 33 of tracking mirror 13 (galvanomirror). When the apparatus is in the reproducing mode and if light beams LB, $LB_1$ and $LB_2$ strike the recorded track so as to be reflected therefrom properly, that is, if there is an effective tracking of the recorded signal, then differential amplifier 26 produces no output signal. However, when miss tracking occurs, that is, when a portion of the recorded signal is not reproduced due to light beams LB, $LB_1$ and $LB_2$ not striking the recorded medium so as to be reflected properly, then differential amplifier 26 produces an output in response thereto to allow tracking mirror 13 to be rotatably moved and thus provide an effective tracking of the recorded signal. As stated above, in the reproducing mode primary beam LB (whose intensity is reduced when in the reproducing mode as compared to the recording mode) scans the recording track T correctly so that an information signal (for example, a data signal) is reproduced from primary photodetector D.

The present invention, therefore, provides various advantages over the prior art. More specifically, and as disclosed heretofore, in the recording mode, the reflected beams of first and second secondary beams $LB_1$ and $LB_2$ are respectively detected by first and second secondary photodetectors $D_1$ and $D_2$. The output signals from detectors $D_1$ and $D_2$ are subtracted from each other to produce a signal representing an amplified difference therebetween. That is, the recording condition of optical recording medium 1 due to primary beam LB is determined based on the signal difference between those reflected beams from that part of the metal layer of optical recording medium 1 on which indicia 5 are not formed and that part on which indicia 5 are perfected. They, by controlling the movement of objective lens 14 so as to maximize the value of the foregoing amplified difference, primary beam LB is focussed properly on the recording medium 1 and results in properly formed indicia thereon. Thus the information signal recorded on optical recording medium 1 is substantially a true recording of the information signal and avoids the recording drawbacks of the prior art.

In addition, since the first and second secondary beams $LB_1$ and $LB_2$ are employed to detect the tracking error in the reproducing mode, the degree of common use of the beam generating means, the photodetector, the circuitry associated therewith and other elements in the apparatus in both the recording and reproducing modes is greatly increased, and results in a reduction of the manufacturing cost.

It should be noted that in recording the information signal on the optical recording medium, any method well known in the art can be used and remain within the spirit and scope of the invention as long as the optical property of the optical recording medium is changed to conform with the method used.

Having described a specific embodiment of the invention with reference to the accompanying drawings, it is to be understood that the invention is not limited to that precise embodiment and that many modifications and variations may be effected therein by one skilled in the art without departing from the spirit or scope of the invention which is intended to be defined by the appended claims.

We claim as our invention:

1. An optical information recording and reproducing apparatus for respectively recording and reproducing an information signal on and from a recording medium, having a recording track, comprising:

beam generator means, including a laser, for generating a primary beam and first and second secondary beams which are spaced apart substantially in the direction along said track on said recording medium with said primary beam impinging on said recording medium between said first and second secondary beams;

focussing lens means for focussing said primary beam and said first and second secondary beams on said recording medium;

detecting means including a primary photodetector for detecting said primary beam reflected from said recording medium and first and second secondary photodetectors for detecting said first and second secondary beams reflected from said recording medium;

beam intensity control means for controlling the intensity of at least said primary beam such that high and low intensities of said primary beam are sufficient to form indicia in said recording medium and to prevent the formation of said indicia, respectively, in accordance with said information signal when said apparatus is in a recording mode, and such that a substantially constant intensity is maintained in at least said primary beam to prevent indicia from being formed in said recording medium when said apparatus is in a reproducing mode;

focussing control means for controlling the position of said focussing lens means in response to output signals of said first and second secondary photodetectors when said apparatus is in said recording mode, including difference signal generator means for generating a difference signal in accordance with a difference between said output signals, and control signal generator means responsive to said difference signal for generating a control signal to control the position of said focussing lens means;

said primary beam and said first and second secondary beams tracing said track in a forward direction to selectively form said indicia along said track when said apparatus is in said recording mode, such that said first secondary beam is reflected from said recording medium at a location along said track ahead of said primary beam in said forward direction where no indicia have yet been formed, and said second secondary beam is reflected from said recording medium at a location along said track behind said primary beam where indicia have already been selectively formed and are in a stable state; and tracking control means for controlling the position of said primary beam in the transverse direction of said recording track in response to said difference signal when said apparatus is in said reproducing mode.

2. An apparatus as in claim 1; wherein said beam generator means includes a diffraction grating for separating a beam from said laser into said primary beam and said first and second secondary beams.

3. An apparatus as in claim 2; wherein said beam intensity control means controls said laser so that the intensity of said beam from said laser is controlled.

4. An apparatus as in claim 1; wherein said focussing control means further acts in response to a focus error signal, generated by said primary photodetector, to control the position of said focussing lens means when said apparatus is in both the recording and reproducing modes of operation.

5. An apparatus as in claim 4; wherein said control signal generator means generates said control signal further in response to said focus error signal so that the difference between said output signals of said first and second secondary photodetectors is maintained at a maximum value when said apparatus is in a recording mode of operation.

6. An apparatus as in claim 1; wherein said focussing control means includes switching means for supplying and interrupting said difference signal to said control signal generator means when said apparatus is in the recording and reproducing modes of operation, respectively.

7. An apparatus as in claim 1; wherein said beam generator means includes a tracking mirror for controlling the position of at least said primary beam on said track of said recording medium and further wherein said tracking control means controls said tracking mirror.

8. An apparatus as in claim 1; wherein said tracking control means acts to control the position of said primary beam in response to said difference signal.

9. An apparatus as in claim 1; wherein said difference signal generating means includes a differential amplifier.

10. An apparatus as in claim 1; wherein said control signal generator means generates said control signal such that the difference between said output signals of said first and second secondary photodetectors is maintained at a maximum value when said apparatus is in said recording mode of operation.

* * * * *